United States Patent
Adiga et al.

(10) Patent No.: US 12,184,099 B2
(45) Date of Patent: Dec. 31, 2024

(54) METHODS AND APARATUSES FOR CHARGING HYBRID BATTERY PACK

(71) Applicant: Samsung Electronics Co., Ltd., Suwon-si (KR)

(72) Inventors: Shashishekara Parampalli Adiga, Bangalore (IN); Mohan Kumar Singh Verma, Bangalore (IN); Ashish Khandelwal, Bangalore (IN); Krishnan S Hariharan, Bangalore (IN); Rajkumar Subhash Patil, Bangalore (IN); Subramanya Mayya Kolake, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 737 days.

(21) Appl. No.: 17/402,875

(22) Filed: Aug. 16, 2021

(65) Prior Publication Data
US 2022/0085620 A1   Mar. 17, 2022

(30) Foreign Application Priority Data

Sep. 16, 2020   (IN) .............................. 202041040160
May 26, 2021   (KR) ........................ 10-2021-0067733

(51) Int. Cl.
H02J 7/00   (2006.01)
(52) U.S. Cl.
CPC .......... *H02J 7/0014* (2013.01); *H02J 7/0048* (2020.01); *H02J 7/0071* (2020.01); *H02J 7/00712* (2020.01)

(58) Field of Classification Search
CPC ...... H02J 7/0014; H02J 7/0048; H02J 7/0071; H02J 7/00712; H02J 7/0013; H02J 7/00047
See application file for complete search history.

(56) References Cited

U.S. PATENT DOCUMENTS

| | | | |
|---|---|---|---|
| 2012/0074894 A1* | 3/2012 | Chen ...................... | B60L 58/20 320/103 |
| 2019/0225092 A1* | 7/2019 | Li .......................... | B60L 58/18 |
| 2019/0366831 A1* | 12/2019 | Cafeo .................. | H02J 7/0013 |

FOREIGN PATENT DOCUMENTS

| | | |
|---|---|---|
| KR | 10-1583383 B1 | 1/2016 |
| KR | 10-2016-0123089 A | 10/2016 |
| KR | 10-1723055 B1 | 4/2017 |
| KR | 10-1956254 B1 | 3/2019 |
| KR | 10-2049778 B1 | 11/2019 |

* cited by examiner

*Primary Examiner* — Jack Chiang
*Assistant Examiner* — Brandon Bowers
(74) *Attorney, Agent, or Firm* — NSIP Law (57) ABSTRACT

Disclosed are methods and apparatuses for charging a hybrid battery pack, the method including determining, by a battery management system (BMS), a current split ratio for allocating charging current to an energy cell and a power cell in a hybrid battery pack, based on any one or any combination of a state of charge (SoC) level of the energy cell at an instance of initiation of charging, a SoC level of the power cell at the instance of the initiation of the charging, a wattage of an adapter for charging the hybrid battery pack, a capacity of the hybrid battery pack, and a charging time period, and charging, by the BMS, the hybrid battery pack by allocating the charging current to the energy cell and the power cell based on the current split ratio.

20 Claims, 8 Drawing Sheets

METHODS AND APARATUSES FOR CHARGING HYBRID BATTERY PACK

CROSS-REFERENCE TO RELATED APPLICATIONS

This application claims the benefit under 35 USC § 119(a) of Indian Patent Application No. 202041040160 filed on Sep. 16, 2020, in the Indian Patent Office, and Korean Patent Application No. 10-2021-0067733 filed on May 26, 2021, in the Korean Intellectual Property Office, the entire disclosures of which are incorporated herein by reference for all purposes.

BACKGROUND

Field

The following description relates to methods and apparatuses for managing current supply to energy cells and power cells of a hybrid battery pack for charging the hybrid battery pack.

Description of Related Art

The power consumption of user devices such as smart phones, Internet of Things (IoT) devices, wearable devices is increasing due to these devices being used to perform an increasing variety of functions. To meet the increasing power demand, battery capacity is being increased and/or faster charging in being enabled. Fast charging reduces the time needed to charge the battery and maximizes battery usage time.

Increasing the power density of the cell (battery) may be used to reduce the charging time. Power cells that are typically low in capacity/energy density are used to increase the power density, which in turn results in shorter usage time. To overcome this, multiple power cells are used, which may collectively increase the capacity of the battery, but increases the volume occupied by the multiple power cells. Energy cells that have a larger capacity, have a slower charge/discharge rate.

Although energy cells increase the capacity of the battery pack, the charging time period of the energy cells is usually long. This may cause inconvenience to the user, if the user is in a hurry and intends to quickly charge the battery pack. The power cells may charge faster, but the charge may not last very long due to the power cells having a smaller capacity. The devices using power cells may not be charged to higher capacities, even if the user charges the battery pack for a longer duration. It is difficult to deliver current to the energy cells or the power cells to obtain a desirable ratio of device usage time and charging time, and to charge the battery pack to a desired level.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method of charging a hybrid battery pack, the method including determining, by a battery management system (BMS), a current split ratio for allocating charging current to an energy cell and a power cell in a hybrid battery pack, based on any one or any combination of a state of charge (SoC) level of the energy cell at an instance of initiation of charging, a SoC level of the power cell at the instance of the initiation of the charging, a wattage of an adapter for charging the hybrid battery pack, a capacity of the hybrid battery pack, and a charging time period, and charging, by the BMS, the hybrid battery pack by allocating the charging current to the energy cell and the power cell based on the current split ratio.

The charging time period may be determined based on at least one of a user input specifying a time period available for charging, or any one or any combination of a usage pattern of a device hosting the BMS, a time of initiation of the charging, an urgency of a user at the time, and a user activity at the time.

The current split ratio may be based on a plurality of plots representing variations of percentage of charging of the hybrid battery pack with respect to time for different current split ratios, and the variations are based on any one or any combination of the SoC level of the energy cell at the instance of the initiation of the charging, the SoC level of the power cell at the instance of the initiation of the charging, the wattage of the adapter, and the capacity of the hybrid battery pack.

The method may include determining a plot from among the plurality of plots based on the SoC level of the energy cell at the instance of the initiation of the charging, the SoC level of the power cell at the instance of the initiation of the charging, the wattage of the adapter, and the capacity of the hybrid battery pack.

The method may include selecting one of the current split ratios in the chosen plot as the current split ratio, wherein the charging current is allocated to the energy cell and the power cell in accordance with the selected current split ratio within the charging time period.

The method may include determining correlations between charging time periods and current split ratios, and determining the current split ratio based on the correlations between the charging time periods and the current split ratios.

In another general aspect, there is provided a battery management system (BMS) include a processor configured to determine a current split ratio for allocating charging current to an energy cell and a power cell in a hybrid battery pack, based on any one or any combination of a state of charge (SoC) level of the energy cell at an instance of initiation of charging, a SoC level of the power cell at the instance of the initiation of charging, a wattage of an adapter for charging the hybrid battery pack, a capacity of the hybrid battery pack, and a charging time period, and to charge the hybrid battery pack by allocating the charging current to the energy cell and the power cell in accordance with the current split ratio.

The processor may be configured to determine the charging time based on at least one of a user input specifying a time period available for charging, or any one or any combination of a usage pattern of a device hosting the BMS, a time of initiation of the charging, an urgency of a user at the time, and a user activity at the time.

The BMS may include a memory configured to store a plurality of plots, wherein the processor may be configured to determine the current split ratio based on the plurality of plots representing variations of percentage of charging of the hybrid battery pack with respect to time, for different current split ratios, and the variations are based on any one or any combination of the SoC level of the energy cell at the instance of the initiation of the charging, the SoC level of the power cell at the instance of the initiation of the charging, the wattage of the adapter, and the capacity of the hybrid battery pack.

The processor may be configured to determine a plot from among the plurality of plots based on the SoC level of the energy cell at the instance of the initiation of the charging, the SoC level of the power cell at the instance of the initiation of the charging, the wattage of the adapter, and the capacity of the hybrid battery pack.

The processor may be configured to select one of the current split ratios in the chosen plot as the current split ratio, and the charging current may be allocated to the energy cell and the power cell in accordance with the selected current split ratio within the charging time period.

The processor may be configured to determine correlations between charging time periods and current split ratios, and to determine the current split ratio based on the correlations between the charging time periods and the current split ratios.

In another general aspect, there is provided a portable terminal for charging a hybrid battery pack, the portable terminal including a hybrid battery pack comprising an energy cell and a power cell, a storage configured to store a plurality of plots, a current split ratio determiner configured to choose a plot from among the plurality of plots, and to determine a current split ratio based on the plot, and a distributor configured to charge the hybrid battery pack by allocating charging current to the energy cell and the power cell in accordance with the determined current split ratio, wherein the plurality of plots represent variations of percentage of charging of the hybrid battery pack with respect to time, for different current split ratios.

The portable terminal may include a parameter verifier configured to verify a state of charge (SoC) level of the energy cell at an instance of initiation of charging, a SoC level of the power cell at the instance of the initiation of the charging, a wattage of an adapter for charging the hybrid battery pack, and a capacity of the hybrid battery pack, and a charging time period determiner may be configured to determine a charging time period, wherein the current split ratio determiner may be configured to determine the current split ratio for allocating charging current to the energy cell and the power cell based on any one or any combination of the SoC level of the energy cell at the instance of the initiation of the charging, the SoC level of the power cell at the instance of the initiation of the charging, the wattage of the adapter, the capacity of the hybrid battery pack, and the charging time period.

The portable terminal may include a pattern verifier configured to verify a usage pattern of the portable device by a user, an urgency verifier configured to determine an urgency of the user at the time of the initiation of the charging based on the usage pattern, and an activity verifier configured to verify a user activity according to a movement of the portable device at the time of the initiation of the charging, wherein the charging time period determiner is further configured to determine the charging time period based on at least one of a user input specifying a time period available for charging, or any one or any combination of the usage pattern of the portable terminal, the time of initiation of charging, the urgency of the user at the time instance of initiation of charging, and the user activity at the time.

The variations may be based on any one or any combination of the SoC level of the energy cell at the instance of the initiation of the charging, the SoC level of the power cell at the instance of the initiation of the charging, the wattage of the adapter, and the capacity of the hybrid battery pack.

The current split ratio determiner may be configured to choose a plot from among the plurality of plots based on the SoC level of the energy cell at the instance of the initiation of the charging, the SoC level of the power cell at the instance of the initiation of the charging, the wattage of the adapter, and the capacity of the hybrid battery pack.

The current split ratio determiner may be configured to select one of the current split ratios in the chosen plot as the current split ratio, wherein the charging current is allocated to the energy cell and the power cell in accordance with the selected current split ratio within the charging time period.

The current split ratio determiner may be configured to determine correlations between charging time periods and current split ratios, and to determine the current split ratio based on the correlations between the charging time periods and the current split ratios.

The energy cell may have a higher capacity density and a lower power density than the power cell.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms of "first," "second,", A, B, (a), or (b) are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

The singular forms "a", "an", and "the" are intended to include the plural forms as well, unless the context clearly indicates otherwise. As used herein, the singular forms are intended to include the plural forms as well, unless the context clearly indicates otherwise. As used herein, the term "and/or" includes any one and any combination of any two or more of the associated listed items. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The use of the term "may" herein with respect to an example or embodiment (e.g., as to what an example or embodiment may include or implement) means that at least one example or embodiment exists where such a feature is included or implemented, while all examples are not limited thereto.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The same name may be used to describe an element included in the examples described above and an element having a common function. Unless otherwise mentioned, the descriptions on the examples may be applicable to the following examples and thus, duplicated descriptions will be omitted for conciseness.

Hereinafter, examples of methods and systems for charging a hybrid battery pack will be described in detail with reference to FIGS. 1 to 6.

The examples disclose methods and apparatuses for allocating charging current to at least one energy cell and at least one power cell of a hybrid battery pack. In an example, an energy cell is a cell having a high capacity density or a high energy density and is also referred to as a "high energy cell". In an example, a power cell is a cell having a high power density and is also referred to as a "high power cell". In an example, the energy cell has a higher capacity density and a lower power density than the power cell. The energy density is the amount of energy that may be stored in a given mass of a substance or apparatuses. The higher the energy density of an apparatuses or material, the greater the amount of energy stored in its mass. The power density is the amount of power per unit volume. The energy cell is high in energy density and thus, supplies low power for a longer period of time. That is, the energy cell has a slow discharge rate. Therefore, the energy cell is advantageous when energy is to be provided for a long period of time, for example, to a battery in a cell phone. The power cell has a high power density and thus, supplies high power for a short period of time. That is, the power cell has a fast discharge rate. Therefore, the power cell is advantageous when high power needs to be supplied for a short period of time, for example, to start or accelerate an automobile.

The charging current is allocated to the at least one energy cell and the at least one power cell in accordance with a dynamic current split ratio. In an example, the current split ratio is determined based on at any one or any combination of state of charge (SoC) levels of the at least one energy cell and the at least one power cell at the time of initiation of charging the hybrid battery pack, a wattage of an adaptor used for charging the hybrid battery pack, capacities of the at least one energy cell and the at least one power cell, and a charging time period within which the charging needs to be completed. The charging time period may be set by a user. In an example, the charging time period may be selected automatically, if the charging time period has not been set by the user. If the charging current is allocated to the at least one energy cell and the at least one power cell in accordance with the current split ratio, then the hybrid battery pack may be charged to a maximum attainable level within the charging time period. The examples enable fast charging and increase the capacity of the hybrid battery pack by splitting the charging current, to be allocated to the at least one energy cell and the at least one power cell, in accordance with the optimal current split ratio.

The examples include redetermining the optimal value of the current split ratio, if there is a variation in any of the wattage of the adapter used for charging the hybrid battery pack, the SoC levels of the at least one energy cell and the at least one power cell at the time of charging the hybrid battery pack, or the capacities of the at least one energy cell and the at least one power cell. The variation(s) may impact the charging percentage of the hybrid battery pack, and a present value of the current split ratio may no longer be optimal. Therefore, the optimal value of the current split ratio is determined when there is a variation in at least one of the wattage of the adapter used for charging the hybrid battery pack, the SoC levels of the at least one energy cell and the at least one power cell at the time of charging the hybrid battery pack, and the capacities of the at least one energy cell and the at least one power cell of the hybrid battery pack.

Figure 1A:
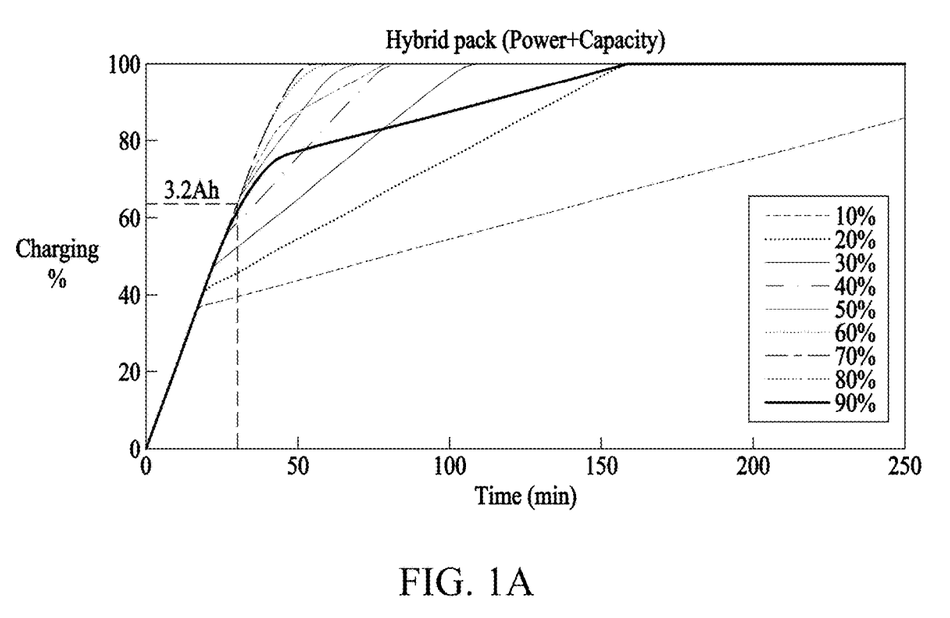
FIGS. 1A and 1B illustrate example graphs depicting variations of percentage of charging of a hybrid battery pack, with respect to charging time period for different current split ratios (inset).
Figure 1B:
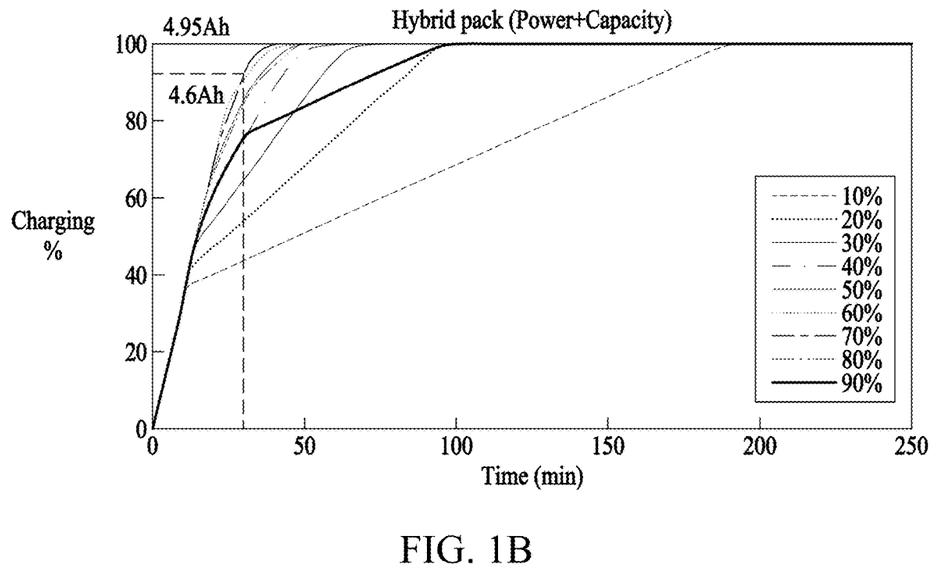

FIGS. 1A and 1B are example graphs depicting variations of percentage of charging of a hybrid battery pack, with respect to charging time period for different current split ratios. The percentage of charging (y-axis) represents the level to which the hybrid battery pack has been charged with respect to the total capacity of the hybrid battery pack, and the time (x-axis) represents the time elapsed in charging the hybrid battery pack to different levels. Each graph depicts multiple variations of percentage of charging with respect to time for multiple current split ratios, indicated in the insets of the graph.

The current split ratios are represented by indicating the percentage of current allocated to the at least one power cell of the hybrid battery pack. For example, the inset 10% indicates that 10% of charging current is allocated to the at least one power cell, and 90% of charging current is allocated to the at least one energy cell of the hybrid battery pack. The variations of percentage of charging with respect to time are obtained for a combination of the wattage of the adapter used for charging the hybrid battery pack, the SoC levels of the at least one energy cell and the at least one power cell at the time of charging the hybrid battery pack, and the capacities of the at least one energy cell and the at least one power cell of the hybrid battery pack.

The variations of percentage of charging with respect to time for different current split ratios, are obtained for a particular combination of charging capacity of the hybrid battery pack (including the capacity of the at least one energy cell and the capacity of the at least one power cell), the SoC levels of the at least one energy (labeled as capacity) cell and the at least one power cell at the time of charging, and the wattage of the adaptor used for charging. In this example, the charging capacity of the hybrid battery pack is 4.95 ampere hour (Ah), wherein the capacity of the at least one energy cell is 3.3 Ah, the capacity of the at least one power cell is 1.65 Ah, and the normalized SoC levels of the at least one energy cell and the at least one power cell at the time of charging is "0" (the hybrid battery pack is drained/empty).

As depicted in FIG. 1A, using an adapter with wattage of 30 watts (W), the percentage of charging is 65%, i.e., 3.2 Ah for a capacity of 4.95 Ah, with a charging time period of 30 minutes (30 minutes had elapsed in charging the hybrid battery pack to 65% of the total capacity), if the charging current allocated to the current cell is greater than 40%. If charging current allocated to the current cell is less than 40% (insets 10%, 20%, 30%, and 40%), the charging time period required for charging the hybrid battery pack to 65% of the total capacity will be greater than 30 minutes.

As depicted in FIG. 1B, using an adapter with wattage of 50 W, the percentage of charging is 92%, i.e., 4.6 Ah for a capacity of 4.95 Ah, with a charging time period of 30 minutes (30 minutes had elapsed in charging the hybrid battery pack to 92% of the total capacity), if the charging current allocated to the current cell is greater than 80%. If the charging current allocated to the current cell is less than 80%, the charging time period required for charging the hybrid battery pack to 92% of the total capacity of the hybrid battery pack will be greater than 30 minutes.

In an example herein, the variations of percentage of charging of a hybrid battery pack with respect to time for different current split ratios are obtained through models of the hybrid battery pack that considers detailed electrochemical and geometrical properties of the cells of the hybrid battery pack. The examples include selecting one of the electrochemical models based on the condition of the hybrid battery pack, and deriving equivalent circuits that approximate the behavior of the hybrid battery pack based on the selected electrochemical model. The equivalent circuits may be used for obtaining the plots.

Figure 2A:
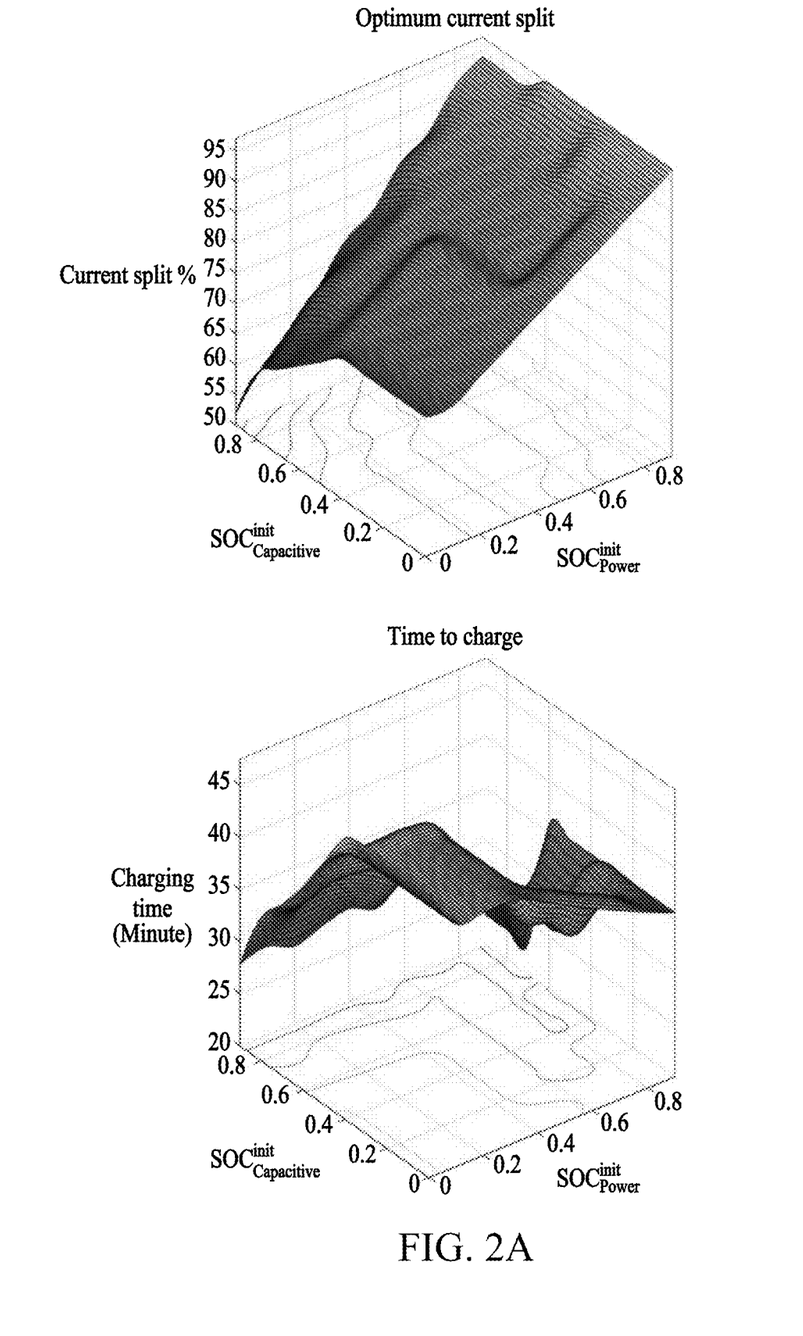
FIGS. 2A to 2D are example graphs depicting surface plots of optimal current split ratios and charging time periods required to charge a hybrid battery pack fully or partially at the optimal current split ratios.
Figure 2B:
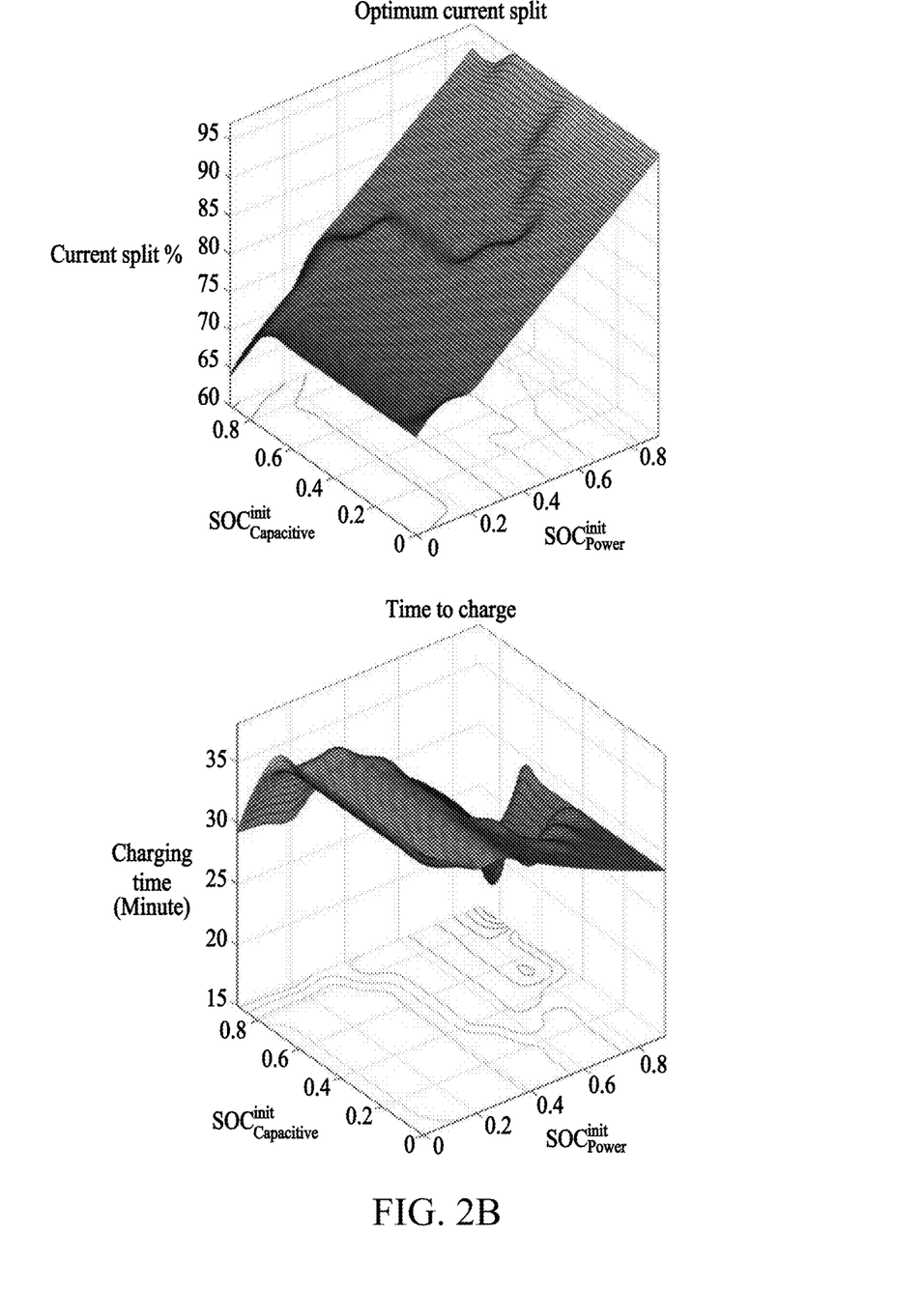
Figure 2C:
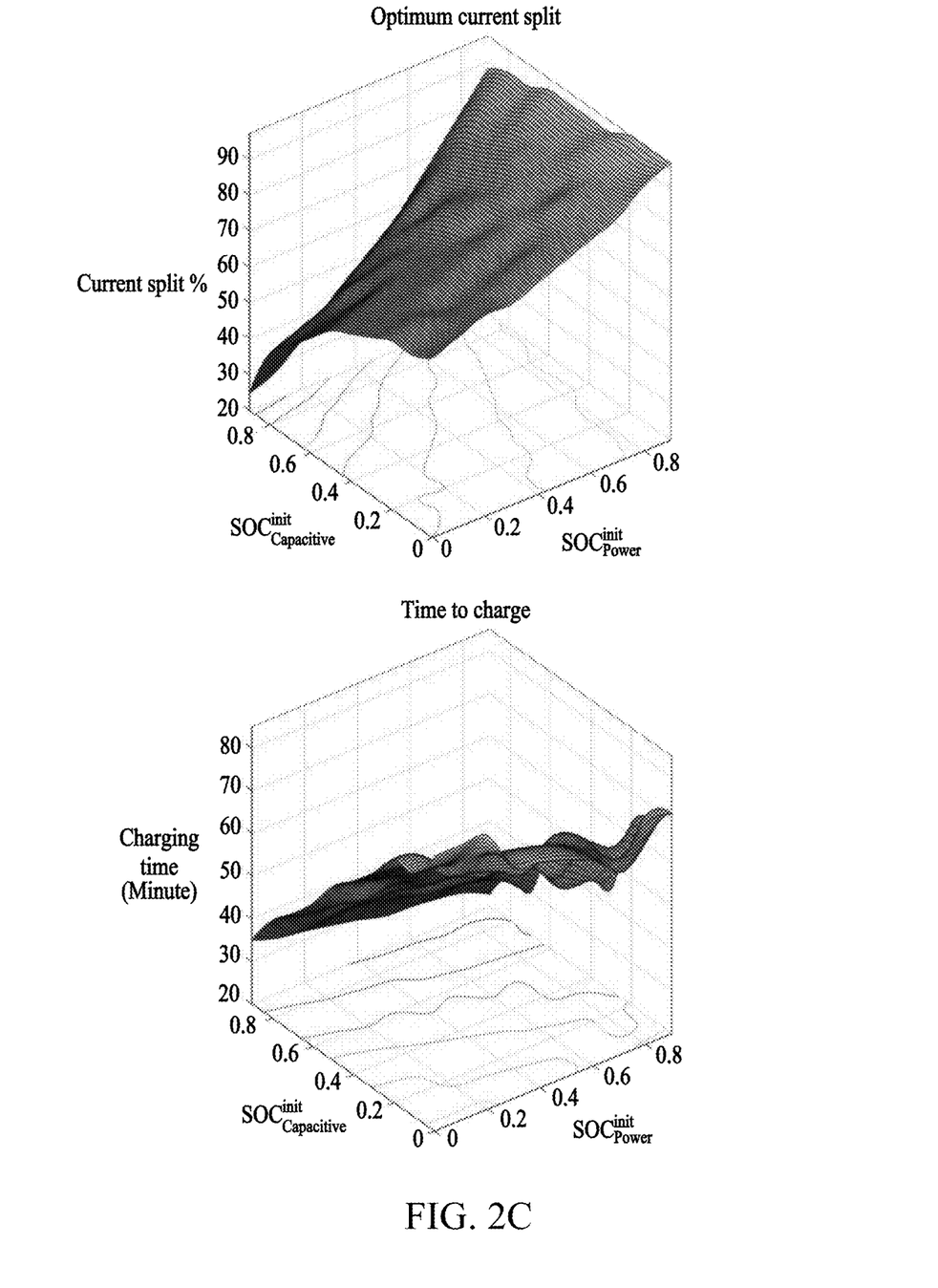
Figure 2D:
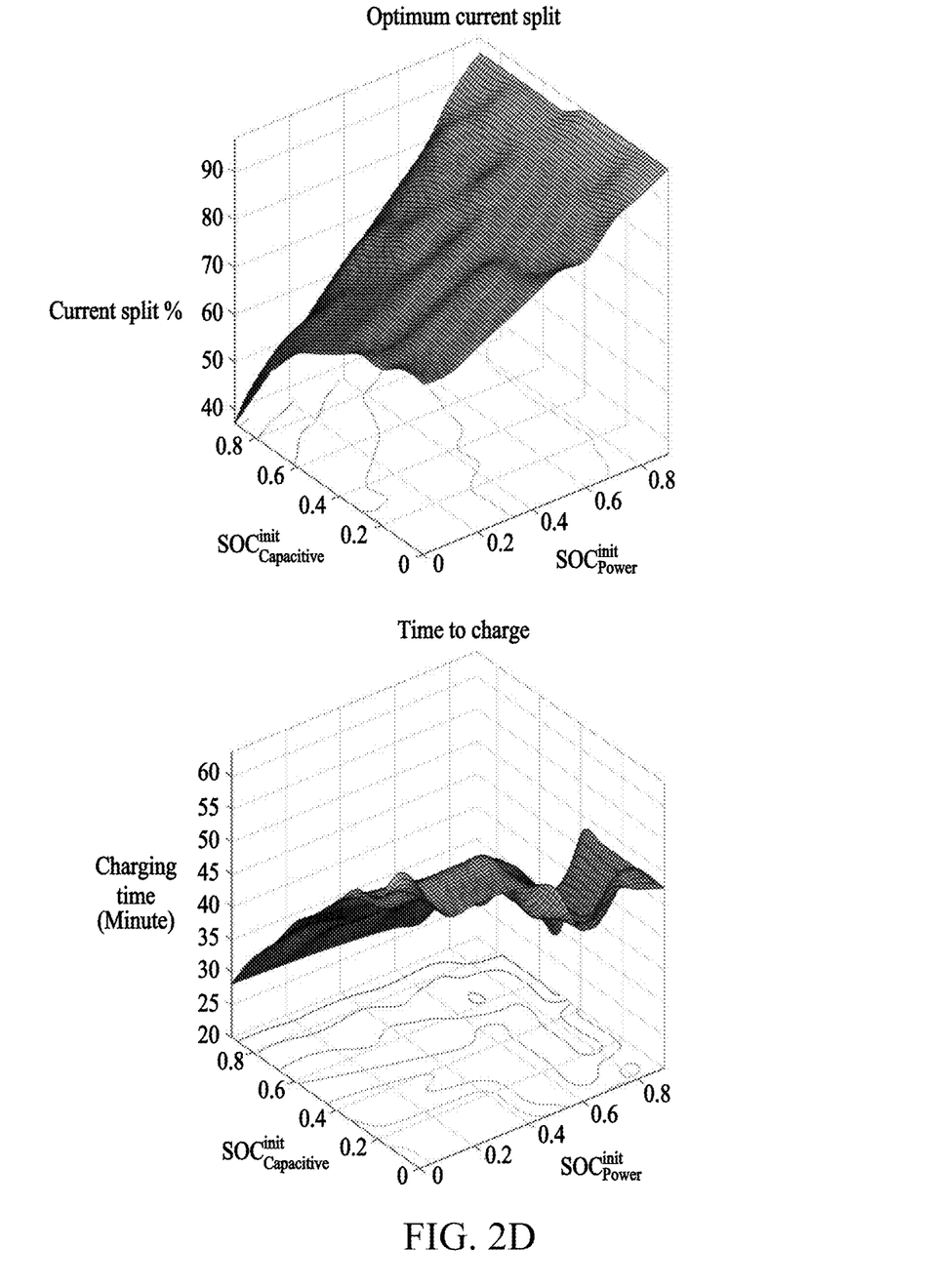

FIGS. 2A to 2D are example graphs depicting surface plots of optimal current split ratios and charging time periods required to charge a hybrid battery pack fully or partially at the optimal current split ratios. The surface plots may vary based on the wattage of the adapter used for charging the hybrid battery pack. The example graphs depict surface plots for adapter wattages of 40 W (FIG. 2A), 50 W (FIG. 2B), 20 W (FIG. 2C), and 30 W (FIG. 2D). The hybrid battery pack includes an energy cell and a power cell. The x-axis represents an SoC level of the energy cell (labeled as $SOC_{capacity}$) at the time of initiating (labeled as $SOC^{init}$) the charging procedure. The y-axis represents an SoC level of the power cell (labeled as $SOC_{power}$) at the time of initiating (labeled as $SOC^{init}$) the charging procedure.

The x-y plane represents different combinations of SoC levels of the energy cell and the power cell at the time of initiation of the charging procedure. The combinations of SoC levels of the energy cell and the power cell may be located on the x-y plane by determining, using a processor, the point (on the x-y plane), where the straight lines emanating from different SoC levels of the energy cell and the power cell meet.

The z-axis depicts the optimum current split ratio and the time required to charge the hybrid battery pack at the optimum current split ratio. For a particular combination of the $SOC^{init}$ of the energy cell and the $SOC^{init}$ of the power cell (a point on the x-y plane), there is an optimum current split (a point on the z-axis). In this example, the z-axis represents the percentage of charging current allocated to the energy cell. For example, consider that the $SOC^{init}$ of the energy cell is 0.4 (an SoC level of 0.4 indicates that the SoC is 40%) and the $SOC^{init}$ of the power cell is 0.6.

The examples include determining the point on the x-y plane where the straight line emanating from the point representing 0.4 on the x-axis and the straight line emanating from the point representing 0.6 on the y-axis meet. From the determined point, if a straight line is constructed in the z-direction, then the point on the z-axis where the straight line contacts the surface is the percentage of charging current allocated to the energy cell. Once the percentage of charging current that is allocated to the energy cell is determined, the percentage of charging current allocated to the power cell is determined. The ratio of the percentage of charging current that is allocated to the energy cell and the percentage of charging current that is allocated to the power cell represents the optimal value of current split ratio.

The points making up the surface representing the percentage of charging current allocated to the energy cell may be determined by a processor, and is visualized using the graph depicting the variations of percentage of charging with respect to time (FIGS. 1A and 1B). Consider the example graphs depicted in FIGS. 1A and 1B. Here, the SoC levels of the energy cell and power cell at the time of initiation of charging procedure are "0".

In an example, an optimum charging time period, within which the hybrid battery pack needs to be fully or partially charged, may be automatically selected or assigned by the user. The examples include, based on the wattage of the adapter, locating the point on the x-axis (in the graphs depicted in FIGS. 1A and 1B), which corresponds to the optimum charging time period. Once the point has been located, the examples include comparing the variations of charging percentages that correspond to the different percentages of current allocated to the power cell of the hybrid battery pack (indicated in the insets of FIGS. 1A and 1B). The percentage of current allocated to the power cell, which allows attaining the highest possible charging percentage at the optimum charging time period (point that has been located on the x-axis) is determined as the optimum percentage of current that needs to be allocated to the power cell.

Consider the optimum percentage of current allocated to the power cell to be 40%. Consequently, the percentage of current allocated to the energy cell will be 60%. Therefore, on the z-axis of the FIGS. 2A to 2D, the point representing 60% is one of the points that make up the surface, which corresponds to a combination of $SOC^{init}$ of the energy cell (x-axis) 0 and $SOC^{init}$ of the power cell (y-axis) 0. Similarly, other points (which make up the surface) corresponding to other combinations of $SOC^{init}$ of the energy cell (x-axis) and $SOC^{init}$ of the power cell (y-axis) may be determined.

In an example, the points making up the surface representing the time period required for fully or partially charging the hybrid battery pack (labeled as time to charge), may be determined by a processor, by noting the optimum time period that has been selected automatically or set by the user. For a particular combination of $SOC^{init}$ of the energy cell and the power cell (a point on the x-y plane), there is a point corresponding to a time period required for fully or partially charging the hybrid battery pack (a point on the z-axis). In this example, considering the $SOC^{init}$ of the energy cell 0 and the $SOC^{init}$ of the power cell 0, one of the points that make up the surface plot corresponds to the time required for fully or partially charging the hybrid battery pack, if the percentage of current allocated to the energy cell is 60%.

Figure 3:
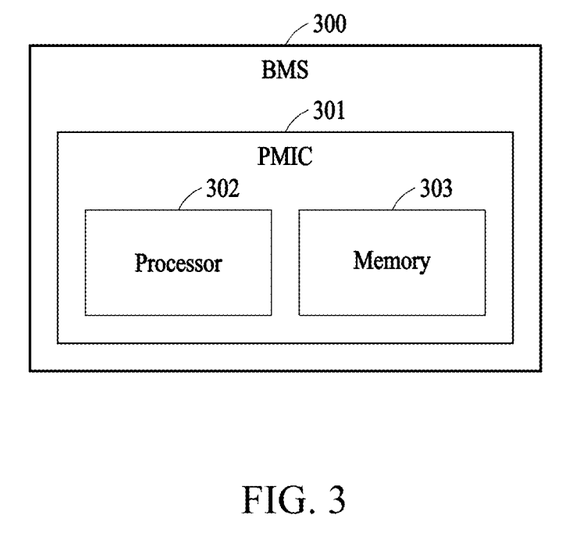
FIG. 3 illustrates an example of a battery management system (BMS) configured to determine an optimal current split ratio for allocating current to energy cells and power cells of a hybrid battery pack, for charging the hybrid battery pack.

FIG. 3 depicts an example of a battery management system (BMS) configured to determine an optimal current split ratio for allocating current to energy cells and power cells of a hybrid battery pack, for charging the hybrid battery pack. The hybrid battery pack may include one or more energy cells and one or more power cells. The hybrid battery pack avails the benefits of the energy cells and the power cells at the same time. The energy cells have high charge capacity, and the power cells have a faster charge/discharge rate. Therefore, the process of charging the hybrid battery pack may be optimized for enabling fast charging (using the power cells) and increasing the time period of operation of the hybrid battery pack (using the energy cells) by allocating charging current to the energy cells and the power cells in accordance with the optimal current split ratio.

As depicted in FIG. 3, a BMS 300 includes a power management integrated circuit (PMIC) 301. The PMIC 301 includes a processor 302 and a memory 303. In an example, the BMS 300 may be a part of an electric vehicle. In an example, the BMS 300 may be a part of a device having a hybrid battery pack, such as, for example, a smart phone, a laptop, a tablet, a computer, a server, a wearable device, a camera, a smart home appliance, a security outpost or system, an Internet of Things (IoT) device, a trimmer, a robot, a vacuum cleaner, an electric vehicle, a hybrid vehicle, and a vehicle infotainment system.

The processor 302 may be configured to determine the fraction of current that is to be allocated to the energy cells and the fraction of current that is to be allocated to the power cells in order to charge the hybrid battery pack. The processor 302 enables a splitter in the BMS 300 to distribute the charging current to the energy cells and the power cells. The distribution of charging current is based on a current split ratio. The current split ratio is the ratio of the fractions of charging current allocated to the energy cells and power cells. In an example, the charging current allocated to the energy cells is the numerator, and the charging current allocated to the power cells is the denominator. In an example, consider that the current split ratio is 1.5, wherein the percentage of charging current allocated to the energy cells is 60%, and the percentage of charging current allocated to the power cells is 40%. In another example, the numerator is the charging current allocated to the power cells, and the denominator is the charging current allocated to the energy cells. Considering the example, the current split ratio will be 0.67, wherein the percentage of charging current allocated to the energy cells and the percentage of charging current allocated to the power cells are 60% and 40% respectively.

In an example, the processor 302 may determine the wattage of an adaptor used for charging the hybrid battery pack and the capacities of the energy cells and the power cells. In another example, the processor 302 may fetch the wattage of the adaptor used for charging the hybrid battery pack and the capacities of the energy cells and the power cells as inputs from a user. The processor 302 may determine SoC levels of the energy cells and the power cells at the time of initiating the charging procedure. In an example, the processor 302 may determine a charging time period within which the hybrid battery pack is to be fully or partially charged. In an example, the processor 302 may receive the charging time period, within which the hybrid battery pack is to be fully or partially charged, as an input from the user.

If the user does not specify the charging time period, the processor 302 may determine the charging time period. In an example, the processor 302 may use artificial intelligence (AI) to determine the charging time period. The processor 302 may monitor a usage pattern of a device hosting the BMS 300 and utilize the usage pattern to determine whether the hybrid battery pack needs to be fully/partially charged. The decision to charge the hybrid battery pack fully or partially is further based on parameters such as, for example, the time of the day when charging is initiated, an urgency of the user at the time of charging, and user activity at different times of the day. The processor 302 may determine the optimum charging time period, within which the hybrid battery pack is to be fully or partially charged, based on the usage pattern and the parameters.

Consider that the user has not specified the charging time period. If the processor 302 is able to determine that the level of urgency of the user is high, the user is busy or on the move, or the time of the day is such the user is expected to charge the device (that is hosting the BMS 300), the processor 302 may choose to partially charge the hybrid battery pack. The processor 302 may predict an appropriate charging time period, which allows the hybrid battery pack to be charged to a maximum attainable level within the predicted charging time period.

In another example, if the processor 302 determines that the level of urgency of the user is low, the user is stationary and/or idle, or the time of the day is such the user is not expected to frequently use the device, the processor 302 may choose to fully charge the hybrid battery pack. The processor 302 may select a particular charging time period, wherein the hybrid battery pack is fully charged within the charging time period.

The processor 302 may determine the optimal current split ratio based on at least one of the wattage of the adaptor used for charging the hybrid battery pack, the capacities of the energy cells and the power cells of the hybrid battery pack, the SoC levels of the energy cells and the power cells at the time of initiating the charging procedure, and the charging time period.

The memory 303 may store plots of variations of the percentage of charging of the hybrid battery pack with respect to time, for different current split ratios (Refer FIGS. 1A and 1B). Each plot may correspond to a particular combination of SoC levels of the energy cells and the power cells when the charging procedure is initiated. Each plot may further correspond to the wattage of the adaptor used for charging the hybrid battery pack and the capacities of the energy cells and the power cells of the hybrid battery pack.

For example, the normalized SoC levels of the energy cells and the power cells at the time of initiating the charging procedure are 0.3 and 0.4, respectively. The wattage of the adaptor is 30 W, and the capacity of the hybrid battery pack (energy cells and power cells combined) is 4 Ah. The processor 302 may choose a plot, which depicts the variations of the percentage of charging of the hybrid battery pack with respect to time, for different current split ratios, corresponding to the normalized SoC levels of 0.3 and 0.4 (the normalized SoC levels of the energy cells and the power cells at the time of initiating the charging procedure are 0.3 and 0.4, respectively), the adaptor wattage of 30 W, and the capacity (of the hybrid battery pack) of 4 Ah. The processor 302 may select one of the current split ratios as the optimal current split ratio from the chosen plot, wherein allocating charging current to the energy cells and the power cells in accordance with the selected current split ratio allows charging of the hybrid battery pack to a maximum attainable level if the hybrid battery pack is charged for the determined charging time period (determined by the processor 302 or received as an input from the user).

The processor 302 may learn, over a period of time, the charging time period and the corresponding current split ratio, on the basis of which charging current needs to be allocated to the energy cells and the power cells, such that the hybrid battery pack is fully or partially charged within the charging time period. This may facilitate faster determination of the optimal current split ratio. It may also permit faster determination of the optimal current split ratio without using the plots of variations of the percentage of charging of the hybrid battery pack with respect to time, for different current split ratios.

The processor 302 may determine the optimal current split ratio if there is a variation in at least one of the wattage of the adaptor used for charging the hybrid battery pack, the capacities of the energy cells and the power cells, and the SoC levels of the energy cells and the SoC levels of the power cells at the time of initiation of the charging procedure. This is because the plot previously used for determining the current split ratio will no longer be feasible with an occurrence of the at least one variation. When the charging current, to be allocated to the energy cells and the power cells, is split in accordance with the appropriate current split ratio for a particular charging time period, the capacity of the hybrid battery pack is likely to increase, and fast charging is enabled.

FIG. 3 illustrates an example of the units of the BMS 300. In an example, the BMS 300 may include fewer or more units. Further, the labels or names of the units of the BMS 300 are used only for illustrative purpose and does not limit the scope of the present disclosure. One or more units may be combined together to perform same or substantially similar function in the BMS 300.

Figure 4:
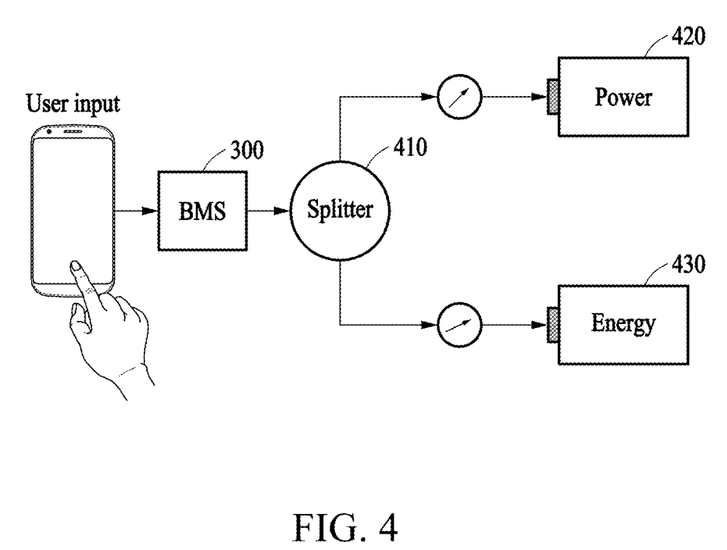
FIG. 4 illustrates an example depicting the splitting of charging current among an energy cell and a power cell of a smart phone.

FIG. 4 is an example of a use case scenario depicting the splitting of charging current among an energy cell and a power cell of a smart phone. The BMS 300 is included in a smart phone. The BMS 300 includes a splitter 410, which may split charging current, such that a portion of the charging current is delivered to a power cell 420 and the remaining portion is delivered to an energy cell 430. The processor 302 in the PMIC 301 of the BMS 300 may configure the splitter 410 to split the charging current in accordance with an optimal current split ratio.

A user may indicate a charging time period within which the charging needs to be completed. Based on the time period indicated by the user, a current split ratio that may maximize the attainable charging level if the hybrid battery pack is charged for the charging time period may be determined.

Figure 5:
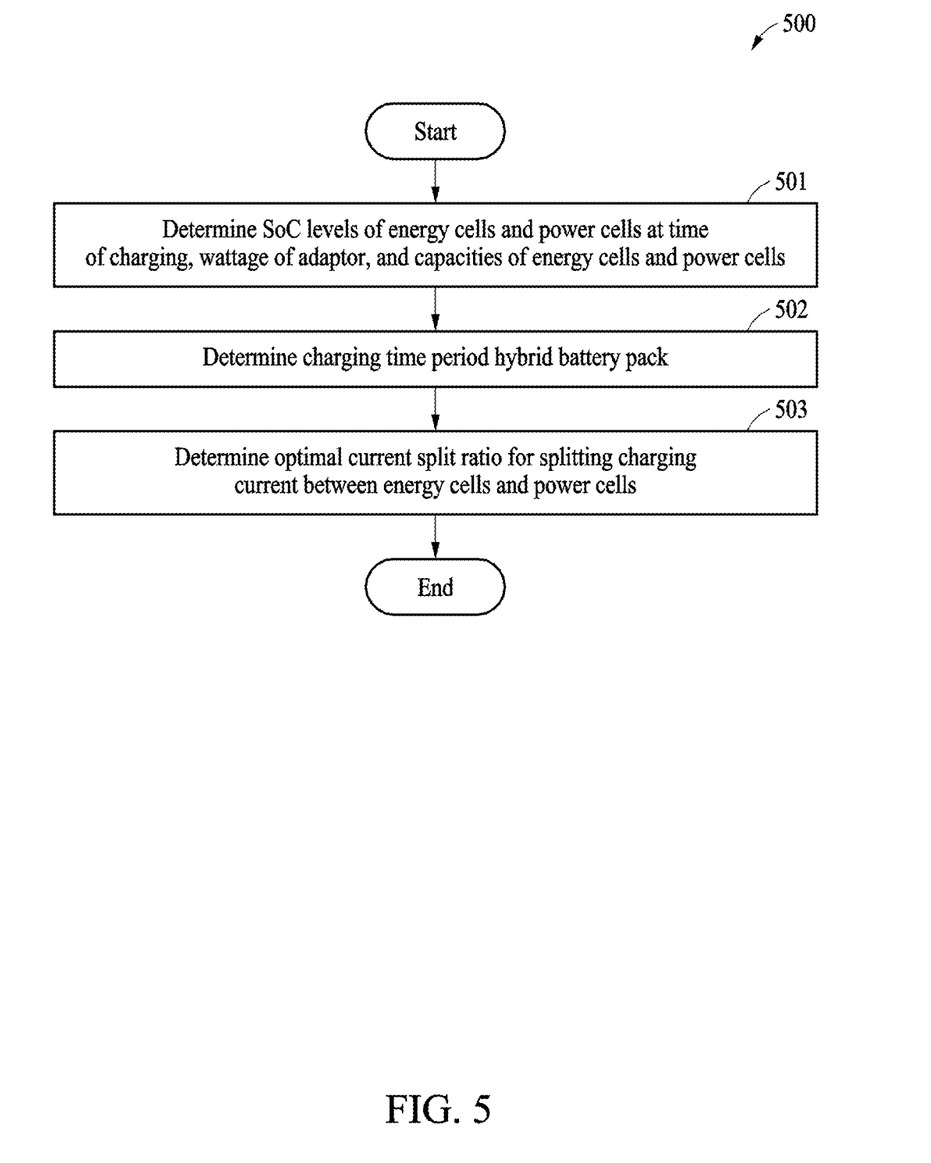
FIG. 5 is a diagram illustrating an example of a method of charging a hybrid battery pack by allocating charging current to energy cells and power cells of the hybrid battery pack.

FIG. 5 is a diagram 500 depicting an example of a method of charging a hybrid battery pack by allocating charging current to energy cells and power cells of the hybrid battery pack. Here, charging current is allocated to the energy cells and the power cells in accordance with an optimal current split ratio, according to the examples as disclosed herein. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. Operations 501 to 503 of FIG. 5 may be performed by the BMS 300. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

In operation 501, the method includes determining SoC levels of the energy cells and the power cells of the hybrid battery pack at the time of initiating the charging (initial SoC), a wattage of an adaptor used for charging the hybrid battery pack, and capacities of the energy cells and the power cells of the hybrid battery pack.

In operation 502, the method includes determining a charging time period to charge the hybrid battery pack. In an example, the charging time period may be received as an input from a user. The hybrid battery pack may be fully or partially charged within the charging time period specified by the user. If the user does not specify the charging time period, the time period for which the hybrid battery pack is to be charged may be determined. In an example, the charging time period may be determined by the ascertaining whether the user intends to fully charge the hybrid battery pack or intends to charge the hybrid battery pack for a certain time period such that the hybrid battery pack attains maximum charging levels within the charging time period.

To ascertain the intent of the user, a usage pattern may be monitored and the usage pattern may be used to determine whether the user intends to fully charge the hybrid battery pack or the user has limited time to charge the hybrid battery pack. In addition, other parameters, such as, for example, a time of charging, an urgency of the user, and a user activity may be determined. In an example, the user intent may be ascertained based on the usage pattern and the parameters. An optimum charging time period may be determined based on the user intent. The hybrid battery pack may be fully or partially charged within the charging time period.

In an example, the user intends to charge the hybrid battery pack during daytime, when the user is busy and has approximately 10 minutes to charge the device. If the user does not provide the charging time period information, the charging time period is determined based on ascertaining the intent of the user, i.e., whether there is a limited time to charge the hybrid battery pack, based on parameters, such as, for example, the time of the day, a user activity at this time of the day, and a mobility of the user at this time to predict the charging time period. The examples may predict a charging time period, wherein the hybrid battery pack is charged to a maximum attainable level if charged for the charging time period.

In another example, the user intends to charge the hybrid battery pack at night or bedtime. The user is not likely to specify the charging time period as there is no urgency. Therefore, the charging time is determined based on ascertaining the intent of the user by determining that the time of the day is nighttime or bedtime and the user activity and mobility of the user at this time are likely to be at a minimum. The examples may ascertain that the user intends to fully charge the hybrid battery pack. The examples may predict a charging time period, wherein the hybrid battery pack is fully charged within the charging time period.

In operation 503, the an optimal current split ratio for splitting charging current between the energy cells and the power cells of the hybrid battery pack may be determined. If the charging current is split to be allocated to the energy cells and the power cells in accordance with the current split ratio, the capacity of the hybrid battery pack may be increased to a maximum possible level, provided the hybrid battery pack is charged for the charging time period. The splitting of the charging current in accordance with the current split ratio enables fast charging within the charging time period. The examples include determining the current split ratio based on at least one of the wattage of the adaptor used for charging the hybrid battery pack, the capacities of the energy cells and the power cells of the hybrid battery pack, the SoC levels of the energy cells and the power cells at the time of initiating the charging procedure, and the charging time period.

The processor 302 may distribute the charging current to the energy cells and the power cells, wherein a portion of the charging current is allocated to the energy cells, and the remaining portion of the charging current is allocated to the power cells. In an example, if the numerator of the current split ratio is the charging current allocated to the power cells, the denominator is the charging current allocated to the energy cells, and the value of the current split ratio is 0.5, then 33.3% of the charging current is allocated to the power cells, and 66.7% of the charging current is allocated to the energy cells. In another example, if the numerator of the current split ratio is the charging current allocated to the energy cells, and the denominator is the charging current allocated to the power cells, then the value of the current split ratio will be "2", and the charging current distribution will be same.

The method of FIG. 5 uses the BMS 300 or one or more hardware device running software programs to obtain plots depicting variations of the percentage of charging of the hybrid battery pack with respect to time, for different current split ratios, wherein the variations are constrained by the SoC levels of the energy cells and the power cells at the instance of initiating the charging procedure, the wattage of the adaptor used for charging the hybrid battery pack, and the capacities of the energy cells and the power cells of the hybrid battery pack. The methods further include a processor configured to choose a plot, which corresponds to the values of normalized SoC levels of the energy cells and the power cells at the time of initiating the charging procedure, the adaptor wattage, and the capacity of the hybrid battery pack.

The method described herein includes selecting a current split ratio as the optimal current ratio from the chosen plot. If the charging current is allocated to the energy cells and the power cells in accordance with the selected current split ratio, then the hybrid battery pack may be charged to a maximum attainable level within the determined charging time period.

The examples include determining correlations between charging time periods and the chosen current split ratio. The examples include learning the correlations and predicting the chosen current split ratio based on determining the charging time period, without reliance on the plots.

The examples disclosed herein describe methods and apparatuses for distributing charging current to energy cells and power cells of a hybrid battery pack for enabling the hybrid battery pack to attain highest possible charging levels if charged for a charging time period. Therefore, it is understood that the scope of the protection is extended to such a program and in addition to a computer readable means having a message therein, such computer readable storage means contain program code for implementation of one or more steps of the method, when the program runs on a server or mobile device or any suitable programmable device. In an example, the method is implemented in through or together with a software program written in example Very High Speed Integrated Circuit (VHSIC) Hardware Description Language (VHDL), or any other programming language, or implemented by one or more VHDL or several software modules being executed on at least one hardware device. The hardware device may be any kind of portable device that may be programmed. The device may also include means, which could be, for example, a hardware means, for example, an application-specific Integrated circuit (ASIC), or a combination of hardware and software means, for example, an ASIC and a field-programmable gate array (FPGA), or at least one microprocessor and at least one memory with software modules located therein. The method examples described herein could be implemented partly in hardware and partly in software. In another example, the present disclosure may be implemented on different hardware devices, e.g., using a plurality of central processing units (CPUs) or power management integrated circuits (PMICs).

Meanwhile, the apparatuses for charging the hybrid battery pack of the present disclosure may be applied to a portable terminal such as a smart phone or a wearable device.

Figure 6:
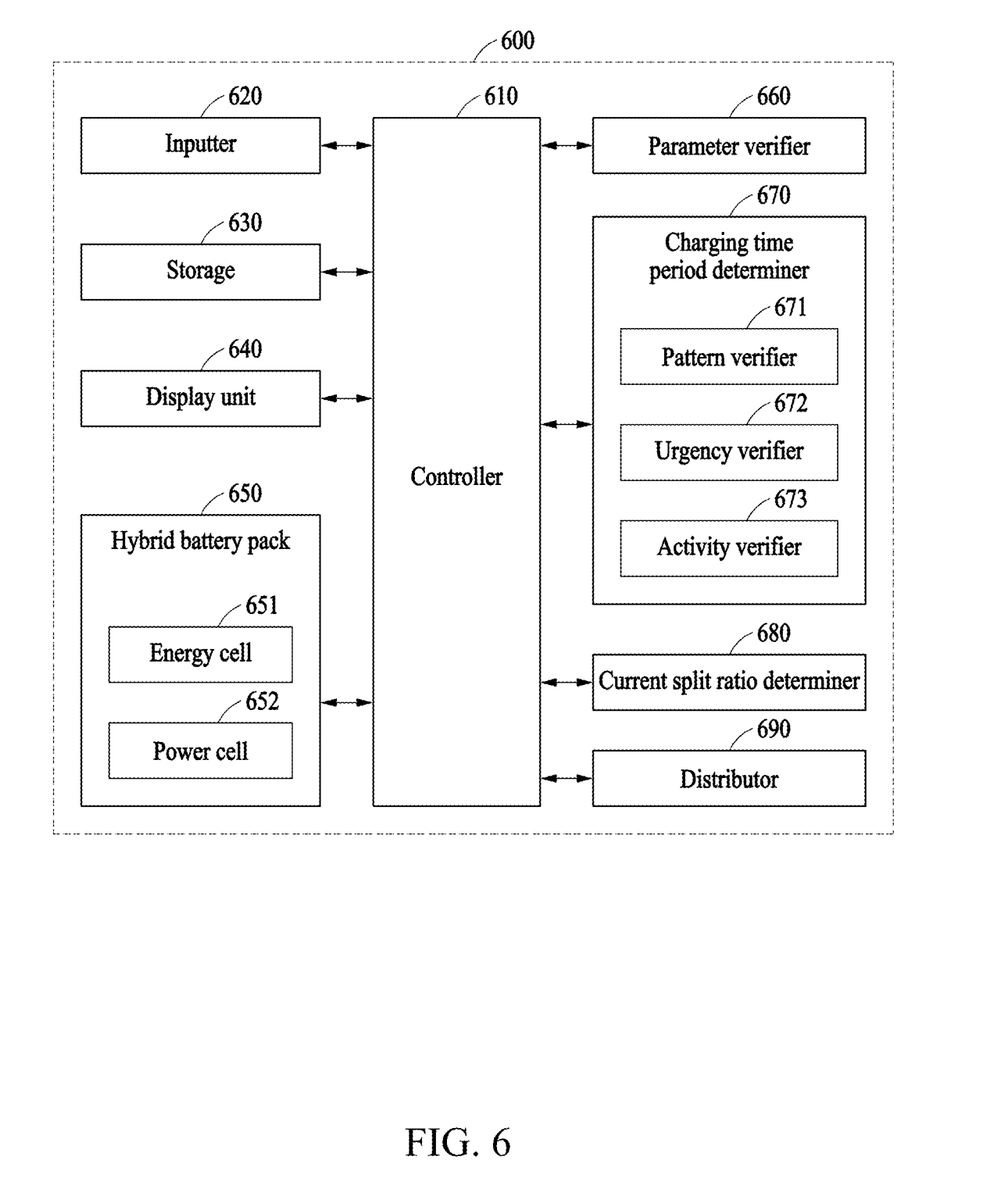
FIG. 6 illustrates an example of a configuration of a portable terminal for charging a hybrid battery pack.

FIG. 6 depicts an example of a configuration of a portable terminal to charge a hybrid battery pack.

Referring to FIG. 6, a portable terminal 600 may include a controller 610, an inputter 620, a storage 630, a display unit 640, a hybrid battery pack 650, a parameter verifier 660, a charging time period determiner 670, a current split ratio determiner 680, and a distributor 690.

The inputter 620 receives an input from a user of the portable terminal 600 and provides the input to the controller 610.

The storage unit 630 may be a storage device including a flash memory, a hard disk drive, and the like. Further description of the storage unit 630 is provided below. The storage 630 stores an operating system for controlling the overall operation of the portable terminal 600, application programs, and data for storage (phone numbers, SMS messages, compressed image files, videos, etc.). In an example, the storage 630 stores a plurality of plots. In an example, the plurality of plots depict variations of percentage of charging of the hybrid battery pack with respect to time, for different current split ratios. Further, the variations are constrained by a combination of an SoC level of at least one energy cell at the instance of initiation of charging, an SoC level of at least one power cell at the instance of initiation of charging, a wattage of an adapter used for charging the hybrid battery pack, and a capacity of the hybrid battery pack. In this example, the percentage of charging attains a maximum value within a charging time period by allocating charging current to the at least one energy cell and the at least one power cell in accordance with a selected current split ratio.

The display unit 640 displays state information (or indicators), limited numbers and characters, moving pictures, and still pictures generated during the operation of the portable terminal 600. Further, the display unit 640 displays information related to the battery pack according to the control of the controller 610.

The hybrid battery pack 650 includes at least one energy cell 651 and at least one power cell 652.

In an example, the parameter verifier 660 verifies a SoC level of the at least one energy cell 651 at an instance of initiation of charging, a SoC level of the at least one power cell 652 at the instance of initiation of charging, a wattage of an adapter used for charging the hybrid battery pack 650, and a capacity of the hybrid battery pack 650.

The charging time period determiner 670 determines a charging time period. The charging time period determiner 670 may include a pattern verifier 671, an urgency verifier 672, and an activity verifier 673.

The pattern verifier 671 verifies a usage pattern of the portable device 900 used by the user.

The urgency verifier 672 determines an urgency of the user at the time instance of initiation of charging based on the usage pattern.

The activity verifier 673 verifies a user activity according to a movement of the portable device 600 at the time instance of initiation of charging, The charging time period determiner 670 determines the charging time period based on at least one of a user input specifying a time period available for charging, and a predicted value of the charging time period. In this example, the predicted value of the charging time period may be derived based on at least one of the usage pattern of the portable terminal 600 used by the user, the time instance of initiation of charging, the urgency of the user at the time instance of initiation of charging, and the user activity at the time instance of initiation of charging.

The current split ratio determiner 680 determines a plot from among the plurality of plots, and determines a current split ratio based on the chosen plot.

The current split ratio determiner 680 determines a corresponding plot from among the plurality of plots based on at least one of the determined SoC level of the at least one energy cell at the instance of initiation of charging, the determined SoC level of the at least one power cell at the instance of initiation of charging, the wattage of the adapter used for charging the hybrid battery pack, the capacity of the hybrid battery pack, and the determined charging time period, and selects one of current split ratios as the determined current ratio from the chosen plot.

The current split ratio determiner 680 may determine correlations between charging time periods and current split ratios, and predict the current split ratio based on the correlations between the charging time periods and the current split ratios.

The distributor 690 charges the hybrid battery pack 650 by allocating the charging current to the at least one energy cell 651 and the at least one power cell 652 in accordance with the current split ratio determined by the current split ratio determiner 680.

The controller 610 may control the overall operation of the portable terminal 600. In addition, the controller 610 may perform the functions of the parameter verifier 660, the charging time period determiner 670, the current split ratio determiner 680, and the distributor 690. The controller 610, the parameter verifier 660, the charging time period determiner 670, the current split ratio determiner 680, and the distributor 690 are separately illustrated to describe their functions separately. Accordingly, the controller 610 may include at least one processor configured to perform the functions of the parameter verifier 660, the charging time period determiner 670, the current split ratio determiner 680, and the distributor 690. In addition, the controller 610 may include at least one processor configured to perform a portion of the functions of the parameter verifier 660, the charging time period determiner 670, the current split ratio determiner 680, and the distributor 690.

In an example, the controller 610 may be a data processing device implemented by hardware including a circuit having a physical structure to perform desired operations. For example, the desired operations may include code or instructions included in a program. For example, the hardware-implemented data processing device may include for example, a microprocessor, a microprocessor, single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a microcomputer, a processor core, a multi-core processor, and a multiprocessor, a central processing unit (CPU), an application-specific integrated circuit (ASIC), and a field-programmable gate array (FPGA), a central processing unit (CPU), a controller and an arithmetic logic unit (ALU), a digital signal processor (DSP), a graphics processing unit (GPU), or an application processor (AP), a neural processing unit (NPU), or a programmable logic unit (PLU).

The principal objective of the examples herein is to disclose methods and apparatuses for providing a hybrid battery pack including at least one energy cell and at least one power cell, wherein charging current to be delivered to the at least one energy cell and the at least one power cell is split based on a dynamic current split ratio, which maximizes charging levels of the hybrid battery pack that is attainable if charged for a charging time period.

Another objective of the examples herein is to select a current split ratio that may enable fast charging of the hybrid battery pack to a charging level desired by a user within a charging time constraint set by the user, and charging the hybrid battery pack to its full capacity within a shortest possible charging time period.

Another objective of the examples herein is to determine an optimal current split ratio based on a wattage of an adapter used for charging the hybrid battery pack, a state of charge (SoC) of the at least one power cell, and an SoC of the at least one energy cell when charging is initiated, wherein the optimal value of the current split ratio varies based on variations in the SoC values of the at least one power cell and the at least one energy cell when charging is initiated and the wattage of the adapter used for charging the hybrid battery pack.

Accordingly, the examples provide methods and apparatuses for distributing charging current to at least one energy cell and at least one power cell of a hybrid battery pack, for enabling the hybrid battery pack to attain highest possible charging levels if charged for a determined charging time period. The examples include distributing the charging current to the at least one energy cell and the at least one power cell in accordance with a current split ratio, wherein a portion of the charging current is allocated to the at least one energy cell and the remaining portion of the charging current is allocated to the at least one power cell. If the charging current is split to be allocated to the at least one energy cell and the at least one power cell in accordance with the appropriate current split ratio, then the percentage of charge (charged level) of the hybrid battery pack may be increased to a maximum attainable level within the charging time period, and fast charging may be enabled.

The current split ratio is dynamic and is dependent on factors such as the wattage of the adaptor used for charging the hybrid battery pack, the capacities of the at least one energy cell and the at least one power cell, and the SoC levels the at least one energy cell and the at least one power cell at the instance of initiation of the charging procedure. The examples include determining the current split ratio if there is a variation in at least one of the wattage of the adaptor used for charging the hybrid battery pack, the capacities of the at least one energy cell and the at least one power cell, and the SoC levels of the at least one energy cell and the at least one power cell when charging is initiated.

The examples include obtaining plots, which depict variations of percentage of charging of the hybrid battery pack with respect to time, for different current split ratios. The variations are constrained by the wattage of the adaptor used for charging the hybrid battery pack, the capacities of the at least one energy cell and the at least one power cell, and the SoC levels of the at least one energy cell and the at least one power cell at the instance of initiation of charging procedure. The examples include obtaining the variations using equivalent circuit models, which describe the hybrid battery pack. The equivalent circuit models are based on electrochemical models of the individual cells of the hybrid battery pack. For a particular combination of the adaptor wattage, the capacities of the at least one energy cell and the at least one power cell, the SoC levels of the at least one energy cell and the at least one power cell prior to charging, and a current split ratio, the examples include determining charging time periods for achieving different charging percentages.

The BMS 300, splitter 410, controller 610, inputter 620, hybrid battery pack 650, parameter verifier 660, charging time period determiner 670, current split ratio determiner 680, distributor 690, pattern verifier 671, urgency verifier 672, activity verifier 673, and other apparatuses, units, modules, devices, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of charging a hybrid battery pack. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application it will be apparent that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of charging a hybrid battery pack, the method comprising:
   determining, by a battery management system (BMS), a current split ratio for allocating charging current to an energy cell and a power cell in a hybrid battery pack, based on any one or any combination of a state of charge (SoC) level of the energy cell at an instance of initiation of charging, a SoC level of the power cell at the instance of the initiation of the charging, a wattage of an adapter for charging the hybrid battery pack, a capacity of the hybrid battery pack, and a charging time period; and
   charging, by the BMS, the hybrid battery pack by allocating the charging current to the energy cell and the power cell based on the current split ratio,
   wherein the current split ratio is based on a plurality of plots representing variations of percentage of charging of the hybrid battery pack with respect to time for different current split ratios.

2. The method of claim 1, wherein the charging time period is determined based on at least one of:
   a user input specifying a time period available for charging; or
   any one or any combination of a usage pattern of a device hosting the BMS, a time of initiation of the charging, an urgency of a user at the time, and a user activity at the time.

3. The method of claim 1, wherein the variations are based on any one or any combination of the SoC level of the energy cell at the instance of the initiation of the charging, the SoC level of the power cell at the instance of the initiation of the charging, the wattage of the adapter, and the capacity of the hybrid battery pack.

4. The method of claim 3, further comprising:
   determining a plot from among the plurality of plots based on the SoC level of the energy cell at the instance of the initiation of the charging, the SoC level of the power cell at the instance of the initiation of the charging, the wattage of the adapter, and the capacity of the hybrid battery pack.

5. The method of claim 4,
   further comprising: selecting one of the current split ratios in the chosen plot as the current split ratio,
   wherein the charging current is allocated to the energy cell and the power cell in accordance with the selected current split ratio within the charging time period.

6. The method of claim 3, further comprising:
   determining correlations between charging time periods and current split ratios; and
   determining the current split ratio based on the correlations between the charging time periods and the current split ratios.

7. A battery management system (BMS) comprising:
   a memory configured to store a plurality of plots; and
   a processor configured to determine a current split ratio for allocating charging current to an energy cell and a power cell in a hybrid battery pack, based on any one or any combination of a state of charge (SoC) level of the energy cell at an instance of initiation of charging, a SoC level of the power cell at the instance of the initiation of charging, a wattage of an adapter for charging the hybrid battery pack, a capacity of the hybrid battery pack, and a charging time period, and to charge the hybrid battery pack by allocating the charging current to the energy cell and the power cell in accordance with the current split ratio,
wherein the processor is further configured to determine the current split ratio based on the plurality of plots representing variations of percentage of charging of the hybrid battery pack with respect to time, for different current split ratios.

8. The BMS of claim 7, wherein the processor is further configured to determine the charging time based on at least one of:
a user input specifying a time period available for charging; or
any one or any combination of a usage pattern of a device hosting the BMS, a time of initiation of the charging, an urgency of a user at the time, and a user activity at the time.

9. The BMS of claim 7, further comprising:
wherein the variations are based on any one or any combination of the SoC level of the energy cell at the instance of the initiation of the charging, the SoC level of the power cell at the instance of the initiation of the charging, the wattage of the adapter, and the capacity of the hybrid battery pack.

10. The BMS of claim 9, wherein the processor is further configured to determine a plot from among the plurality of plots based on the SoC level of the energy cell at the instance of the initiation of the charging, the SoC level of the power cell at the instance of the initiation of the charging, the wattage of the adapter, and the capacity of the hybrid battery pack.

11. The BMS of claim 10, wherein the processor is further configured to select one of the current split ratios in the chosen plot as the current split ratio, and
wherein the charging current is allocated to the energy cell and the power cell in accordance with the selected current split ratio within the charging time period.

12. The BMS of claim 9, wherein the processor is further configured to determine correlations between charging time periods and current split ratios, and to determine the current split ratio based on the correlations between the charging time periods and the current split ratios.

13. A portable terminal for charging a hybrid battery pack, the portable terminal comprising:
a hybrid battery pack comprising an energy cell and a power cell;
a storage configured to store a plurality of plots;
one or more processors configured to:
choose a plot from among the plurality of plots, and to determine a current split ratio based on the plot; and
charge the hybrid battery pack by allocating charging current to the energy cell and the power cell in accordance with the determined current split ratio,
wherein the plurality of plots represent variations of percentage of charging of the hybrid battery pack with respect to time, for different current split ratios.

14. The portable terminal of claim 13, wherein the one or more processors are further configured to:
verify a state of charge (SoC) level of the energy cell at an instance of initiation of charging, a SoC level of the power cell at the instance of the initiation of the charging, a wattage of an adapter for charging the hybrid battery pack, and a capacity of the hybrid battery pack; and
determine a charging time period, and
wherein, for the determining of the current split ratio, the one or more processors are configured to determine the current split ratio based on any one or any combination of the SoC level of the energy cell at the instance of the initiation of the charging, the SoC level of the power cell at the instance of the initiation of the charging, the wattage of the adapter, the capacity of the hybrid battery pack, and the charging time period.

15. The portable terminal of claim 14, wherein the one or more processors are further configured to:
verify a usage pattern of the portable device by a user;
determine an urgency of the user at the time of the initiation of the charging based on the usage pattern; and
verify a user activity according to a movement of the portable device at the time of the initiation of the charging,
wherein, for the determining of the charging time period, the one or more processors are further configured to determine the charging time period based on at least one of:
a user input specifying a time period available for charging; or
any one or any combination of the usage pattern of the portable terminal, the time of initiation of charging, the urgency of the user at the time instance of initiation of charging, and the user activity at the time.

16. The portable terminal of claim 14, wherein the variations are based on any one or any combination of the SoC level of the energy cell at the instance of the initiation of the charging, the SoC level of the power cell at the instance of the initiation of the charging, the wattage of the adapter, and the capacity of the hybrid battery pack.

17. The portable terminal of claim 14, wherein, for the determining of the current split ratio, the one or more processors are further configured to choose a plot from among the plurality of plots based on the SoC level of the energy cell at the instance of the initiation of the charging, the SoC level of the power cell at the instance of the initiation of the charging, the wattage of the adapter, and the capacity of the hybrid battery pack.

18. The portable terminal of claim 17, wherein, for the determining of the current split ratio, the one or more processors are further configured to select one of the current split ratios in the chosen plot as the current split ratio,
wherein the charging current is allocated to the energy cell and the power cell in accordance with the selected current split ratio within the charging time period.

19. The portable terminal of claim 14, wherein, for the determining of the current split ratio, the one or more processors are further configured to:
determine correlations between charging time periods and current split ratios; and
determine the current split ratio based on the correlations between the charging time periods and the current split ratios.

20. The portable terminal of claim 14, wherein the energy cell has a higher capacity density and a lower power density than the power cell.

* * * * *